United States Patent [19]

Tanis

[11] Patent Number: 4,787,400

[45] Date of Patent: Nov. 29, 1988

[54] COMBINE CONVEYOR

[75] Inventor: Dale R. Tanis, Naperville, Ill.

[73] Assignee: J. I. Case Company, Racine, Wis.

[21] Appl. No.: 101,499

[22] Filed: Sep. 28, 1987

[51] Int. Cl.⁴ .............................................. A01F 7/00
[52] U.S. Cl. .................................. 130/27 T; 56/14.6; 198/731
[58] Field of Search ............ 130/27 R, 27 T, DIG. 2; 56/14.6; 198/725, 728, 730, 731, 732

[56] References Cited

U.S. PATENT DOCUMENTS 3,780,851 12/1973 Bichel et al. ...................... 56/14.6 X
3,967,719 7/1976 Kloefkorn et al. .............. 56/14.6 X Primary Examiner—Stephen F. Husar
Attorney, Agent, or Firm—Peter N. Jansson, Ltd.

[57] ABSTRACT

An improved combine conveyor of the type having a conveyor surface, elongated carriers across the surface, and endless chains to move the carriers along the conveyor. The carriers are resiliently deformable slats adjustably secured to the chains by self-adjusting, preferably double-pivoting, attachment devices. The slats are preferably flat, of spring steel, angled with respect to the surface, and in a trailing position with respect to their attachment to the chains.

20 Claims, 4 Drawing Sheets

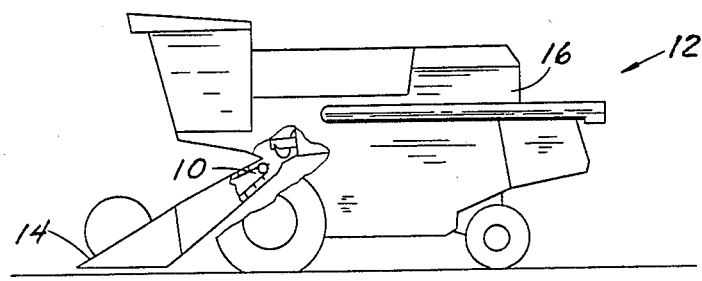
FIG. 1
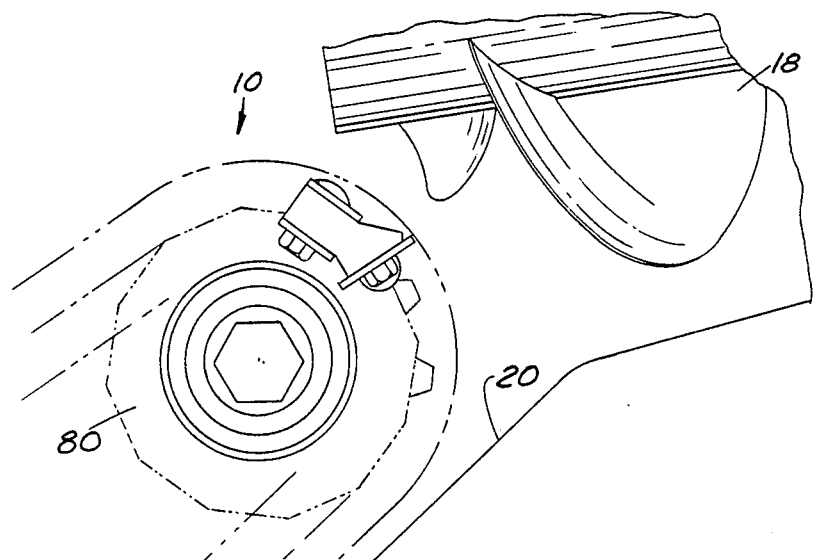
FIG. 2
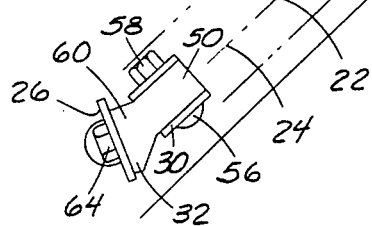

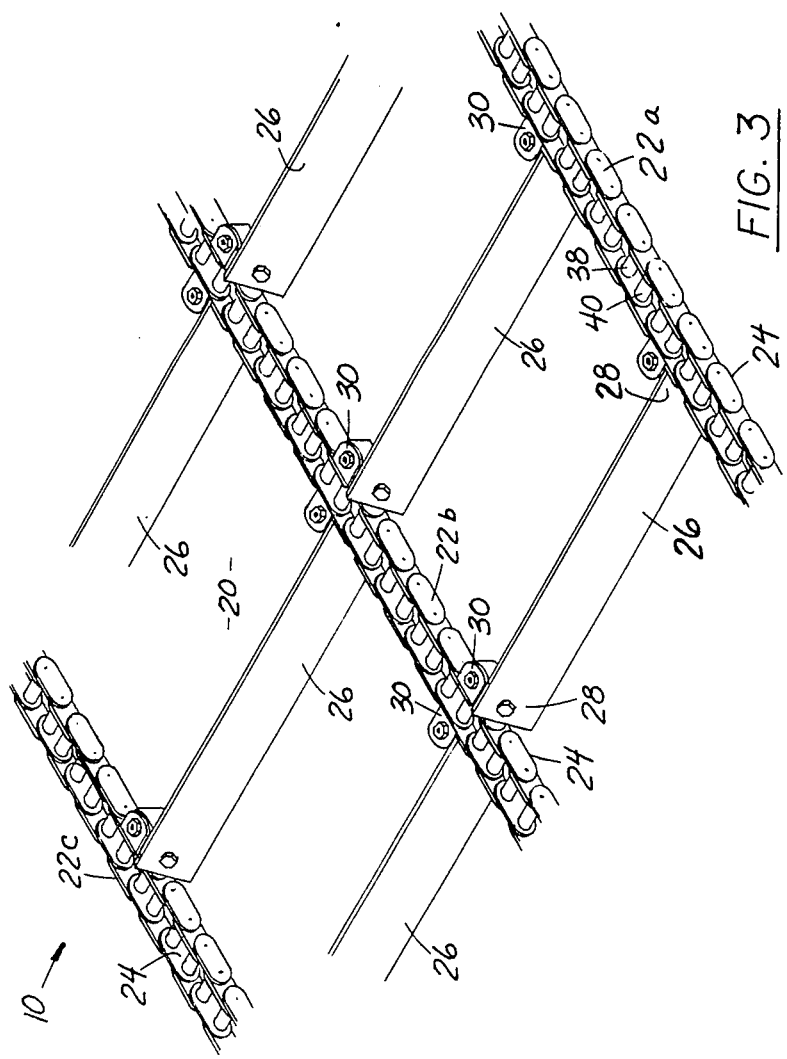

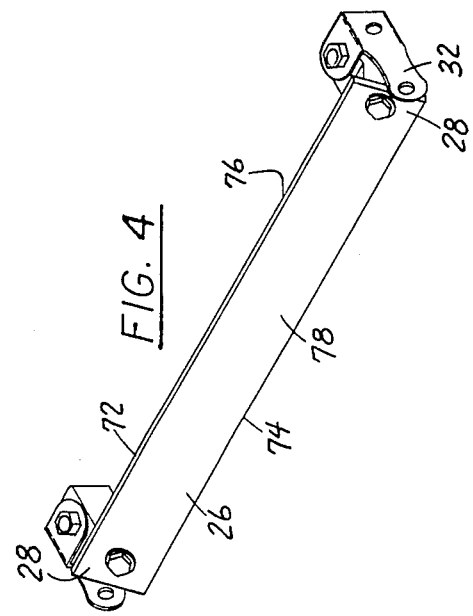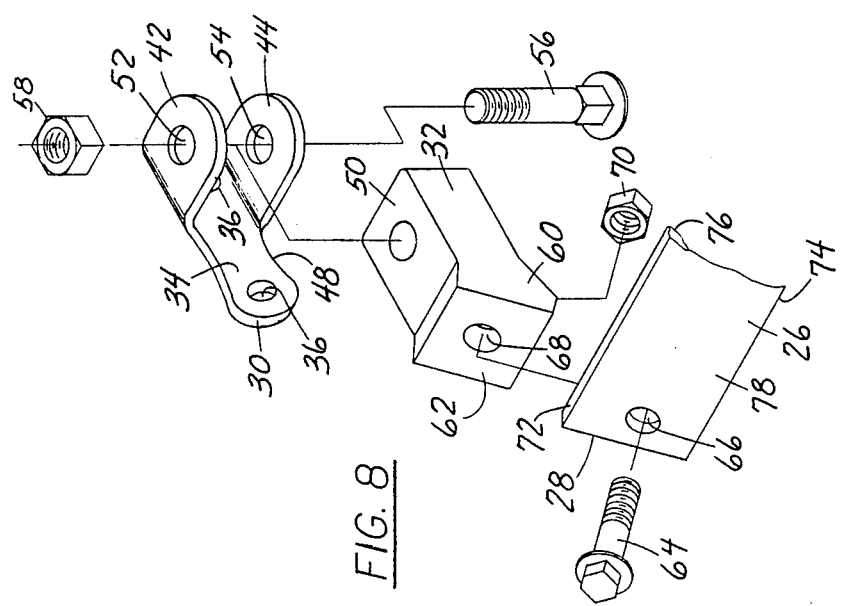

COMBINE CONVEYOR

FIELD OF THE INVENTION

This invention is related generally to combine conveyors for moving crop material to threshing apparatus and, more particularly, to the elongated carriers of such conveyors and the means for securing opposite ends of the carriers to drive chains or the like.

BACKGROUND OF THE INVENTION

Combines for harvesting various crops have long included conveyors for moving crop material from cutting or pickup apparatus upwardly and rearwardly along a conveyor surface to an auger or other means for feeding the material into threshing apparatus.

Such conveyors typically include a fixed conveyor surface tilted upwardly toward the threshing apparatus, at least two (often three) endless chains driven by sprockets beside the conveyor surface and having parallel reaches extending along the surface, and a series of elongated carriers secured at their opposite ends to a pair of chains and extending across and above the surface, usually in close proximity to it. Such elongated carriers are driven along the conveyor surface by the chains and serve as means to carry crop material toward the threshing apparatus. The conveyor surface is usually along the lower reaches of the endless chains, and crop material is moved in an undershot manner.

Examples of such prior combine conveyors are disclosed in the following U.S. Pat. Nos. : 3,939,847 (Straeter); 4,498,483 (Dammann); 3,967,719 (Kloefkorn et al.); 3,780,851 (Bichel et al.); and 4,227,538 (Long et al.).

Prior combine conveyors of the type described have a number of problems and shortcomings. They are often prone to malfunctions caused by part breakage and deformation. This is caused by the extreme forces and loads applied to them. The parts which break most often include the elongated carriers themselves and the connectors securing them to the chains.

Extreme loads, shocks and forces on such parts are caused by a variety of conditions. Among these are: overloading of crops on the conveyor, particularly when accompanied by an excessive wedging and/or build-up of crops between parts; encountering obstacles such as stones while the conveyor is moving; and variations in chain height (between the two chains supporting an elongated carrier) such as when one of the chains rides over a sprocket tooth. These conditions are not at all uncommon in combine operations.

The extreme forces and shock loads are applied in various directions — sometimes as side loads, sometimes as twisting loads. They can cause permanent deformation of metal parts, including the elongated carriers themselves, immediate breakage of connectors in some cases, stress cracks which eventually lead to breakage in other cases, and all too often catastrophic failures of the equipment when it is needed the most.

Another problem with certain prior combine conveyors is their tendency toward excessive conveyor back feed, that is, the inability of the conveyor to more completely release the crop material to the auger above, particularly when there is a heavy flow of such material. In such cases, some crop material is carried back down the conveyor along the upper reach of the chains, the crop material being held against the back portions of the elongated carriers.

In response to the considerable problems related to stress and breakage, there has been a tendency to build sturdier and stouter elongated carriers and chain-mounting devices. This is typically done by adding material thickness and/or by configuring the elongated carriers to add structural strength. These efforts in some cases may tend to forestall problems, while in other cases they may result in more difficult clogs and jams and forces with all the attendant stress and failure of material.

There has long been a clear need for an improved combine conveyor.

OBJECTS OF THE INVENTION

It is an object of this invention to provide an improved combine conveyor overcoming problems and shortcomings of the prior art, including those mentioned above.

Another object of this invention is to provide a combine conveyor which can better withstand the many and varied stresses and forces applied to it during operation.

Another object of this invention is to provide a combine conveyor less susceptible to catastrophic failure during use.

Another object of this invention is to provide a combine conveyor with improved shock-absorbing characteristics.

Another object of this invention is to provide a combine conveyor better able to withstand malfunctions of the drive chains and sprockets which impose additional stresses on parts.

Another object of this invention is to provide a combine conveyor which reduces back feed of crop material and reduces build-up of crop material on the back of the elongated carriers.

Another object of this invention is to provide a combine conveyor which will operate problem-free for extended periods.

These and other important objects will be apparent from the descriptions of this invention which follow.

SUMMARY OF THE INVENTION

This invention is an improved combine conveyor of the type used for elevating cut crop material to the threshing apparatus of axial-flow combines.

The improved conveyor of this invention is of the type typically used to take fresh-cut crop material fed to it at a lower end of the conveyor and deliver such crop material in an undershot manner along a slanted surface to an auger or other up-take means at an upper end of the conveyor. The improved combine conveyor of this invention overcomes the aforementioned problems and shortcomings of devices of the prior art.

As in other combine conveyor apparatus of this general type, the invention includes a conveyor surface, at least two carrier chains having parallel reaches along the surface, elongated carriers extending across the surface in spaced fashion, and means securing opposite ends of the elongated carriers with respect to the chains. The chains are driven by sprockets and are endless loops which form the parallel reaches along the conveyor surface.

The improved conveyor of this invention has resiliently deformable slats as the carriers, and the means securing opposite ends of the slats includes means allowing a degree of adjustment in both the position and the orientation of the ends. These characteristics allow the carriers in this sort of combine conveyor to respond to loads, forces and obstacles of various kinds without damaging the conveyor.

In highly preferred embodiments, the slats are flat and are made of spring steel to have excellent resilience. The term "resiliently deformable" means that the slats are capable of being bent and twisted in various directions, in response to loads, forces and obstacles of the type discussed above, and then recovering their original configurations or shapes. That is, such deformations, rather than being permanent, are transitory, lasting only as long as the load, force or obstacle remains in effect or in place.

In highly preferred embodiments, the slats are angled with respect to the surface, each having a lead edge away from the surface and a trailing edge adjacent to the surface. With this orientation of slats, material carried by the conveyor tends to be drawn against the surface.

The means securing each slat end with respect to the chains preferably includes an attachment link which is attached to the chain, a slat connector which is pivotably attached to the attachment link, and means pivotably attaching the slat to the slat connector. A double-pivoting attachment of each slat end is highly preferred.

The pivotable attachment of the slat connector to the attachment link is preferably about a first axis which is transverse to the chain direction, and the pivotable attachment of the slat to the slat connector is preferably about a second axis which is transverse both to the first axis and to the chain direction. This provides the preferred double-pivoting attachment. The first axis is substantially normal (that is, perpendicular) to the chain direction.

The pivotable attachment of the slat connector to the attachment link, at least in the preferred form just described, allows rotational movement at the connection in a direction toward the slat — that is, a rotational adjustment accommodating a sort of forward bowing of the slat. The pivotable attachment of the slat to the slat connector, at least in the preferred form just described, allows rotational movement in a direction away from the conveyor surface — that is, a sort of lifting action.

The attachment link preferably has a main portion attached to two chain pins, including a forward pin and a rearward pin, and pivot-mounting portions extending laterally from the main portion. The slat connector has a link-mounting portion engaging the pivot-mounting portion of the attachment link.

In certain preferred embodiments, the pivot-mounting portions of the attachment link include spaced, aligned upper and lower portions extending along the upper and lower edges of the attachment link main portion, respectively, and the link-mounting portion of the the slat connector is received between such upper and lower portions. Pivot means, such as a bolt extending through openings in the link-mounting portion and the upper and lower portions, join the slat connector to the attachment link.

The main portion of the attachment link itself preferably forms a portion of the chain.

In highly preferred embodiments, each slat connector has a slat-mounting portion which is behind the link-mounting portion and which is located closer to the rearward pin than the forward pin. Mounting the slats in this trailing fashion, particularly when combined with the aforementioned angled slat mounting, in which each slat has a lead edge away from the conveyor surface and a trailing edge adjacent to the surface, has an important advantage. This arrangement tends to reduce accumulation of crop material on the back side of the slat at the time the slat begins its return movement, along the endless chains which drive it, after bringing crop material up to the auger or other take-up apparatus.

The improved combine conveyor has a number of other important advantages over apparatus of the prior art. The slats will maintain their straightness despite repeated shock loads, forces, obstacles, and the like. This increases the useful life of the slats and the entire conveyor apparatus. Stress cracks and other damage to parts are much less likely to develop.

The apparatus of this invention can accommodate, without undue material stress, events which place twisting loads or side loads on the slats, whether they involve momentary chain height variations such as occur when one of the chains improperly engages a sprocket tooth, momentary imposition of force by a rock or other obstacle, or any of several other events occurring in combine operations. In the past these events frequently led to carrier damage, material fatigue, and sometimes catastrophic failures; with this invention they lead only to resilient slat deformation and pivoting action at slat ends. So damage to parts is avoided.

BRIEF DESCRIPTION OF THE DRAWINGS

FIG. 1 is a side elevation of an axial flow combine having an improved combine conveyor in accordance with this invention.

FIG. 2 is an enlarged fragmentary side elevation of a portion of the combine conveyor of FIG. 1 and an adjacent auger which receives crop material from the conveyor.

FIG. 3 is a fragmentary perspective view of the lower reach of the conveyor.

FIG. 4 is a perspective view of one of the slats of such conveyor and the apparatus used for securing the end of the slat to a drive chain.

FIG. 8 is an exploded view of the end of a slat and the apparatus for securing such slat to a chain.

DETAILED DESCRIPTIONS OF PREFERRED EMBODIMENTS

Figure 6:
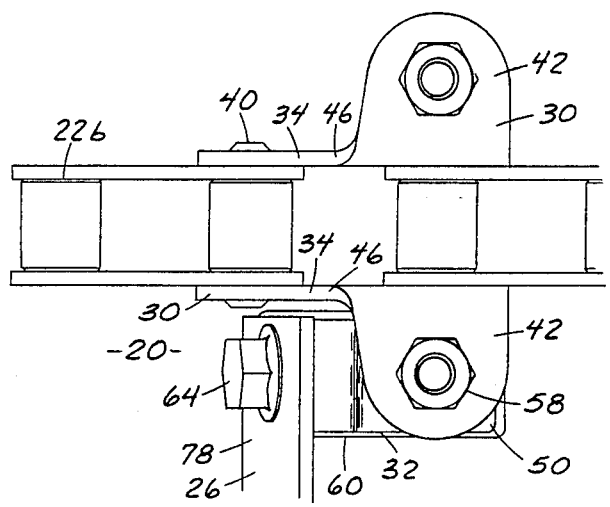
FIG. 6 is a top view of FIG. 5, illustrating a center chain with slats on either side thereof.
Figure 5:
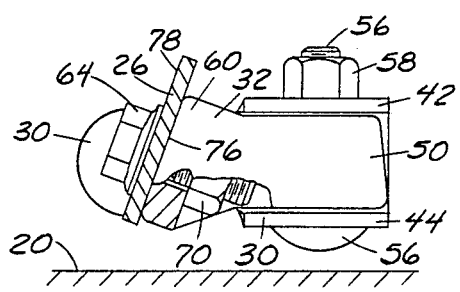
FIG. 5 is an enlarged side elevation of the device of FIG. 4, shown attached to a chain.

The drawings illustrate a combine conveyor 10 which, as shown in FIGS. 1 and 2, is part of a combine 12. Combine conveyor 10 is located between a crop pick-up apparatus 14 and the threshing apparatus 16. Combine conveyor 10 moves crop material from pick-up apparatus 14 to an auger 18 which takes the crop material into threshing apparatus 16.

Combine conveyor 10 has a conveyor surface 20 which is flat and substantially planar, and is oriented at an upward slant toward auger 18 and threshing apparatus 16. Conveyor 10 also has a plurality of chains 22, including chains 22a, 22b and 22c, which have parallel lower reaches 24 extending along and just above conveyor 20.

Extending across and just above conveyor surface 20 are a number of slats 26, the characteristics of which form a part of this invention. Slats 26 have opposite ends 28 which are secured with respect to chains 22 by securing means hereafter described, such securing means also forming a part of this invention. Slats 26 and their securing means give a shock-absorbing ability to the combine conveyor which serve to overcome many of the problems and shortcomings of prior combine conveyors.

Slats 26 are spaced equally around the endless loops of chains 22. Slats 22 are each perpendicular to the direction of conveyor movement, which, of course, is the direction of chain lower reaches 24.

Slats 26 are flat (that is, planar) resiliently deformable pieces. "Resiliently deformable" means that the slats are capable of being bent, twisted or otherwise deformed as described above by the shocks and forces applied during operation without permanent deformation. Thus, when the shocks and forces are no longer applied, the slats immediately return to their original flat configuration without having sustained damage.

Such resiliently deformable characteristic is achieved in part by a proper choice of materials and dimensions for slats 26. While preferred dimensions and materials will vary greatly depending upon a number of factors, such as the overall size of the combine, the intended use and the extent of the expected load, some useful guidelines and specific examples of preferred materials and dimensions can be given.

For combines of substantial size, such as those used in harvesting corn, spring steel is a highly preferred material for slats 26. Spring steel is steel treated to have the ability to recover to its original flat configuration after substantial deformation. One preferred spring steel is a 1060–1080 steel with a hardness on a Rockwell C scale of C40–45, tempered to 500° F. minimum.

Slats of such preferred spring steel, intended for use in a combine generally of the size described, preferably have a material thickness of about 4–5 mm. As shown best in FIG. 4, slats 26 are rectangular in shape. The preferred width for such slats is about 30–50 mm, while a preferred length is about 300–600 mm. Acceptable dimensions can vary greatly. Preferred dimensions are somewhat dependent on the exact material used. One dimension is often somewhat dependent on other dimensions.

While spring steel is a highly preferred material for slats 26, other materials may be used provided they have the required resiliently-deformable characteristics. Other suitable materials include various other metals and metal alloys and various plastics chosen or formulated to provide the desire characteristics.

The resilient deformation of slats 26 is facilitated and accommodated by the means used to secure slats 26 to chains 22. Such securing means allow adjustment of the position and orientation of slat opposite ends 28 as slat 26 is deformed.

Such securing means, for each slat end 28, includes an attachment link 30 and a slat connector 32. Attachment link 30 has a main portion 34 having two holes 36 sized and positioned to allow attachment link 30 to be snapped onto two consecutive chain pins — a forward pin 38 and a rearward pin 40. Thus, main portion 34 of attachment link 30 itself forms a portion of the chain in the normal manner of a chain link.

Attachment link 30 also has spaced upper and lower pivot-mounting portions 42 and 44 which extend laterally from upper and lower edges 46 and 48, respectively, of main portion 34. Slat connector 32 has a link-mounting portion 50 which is received between upper and lower pivot-mounting portions 42 and 44. As shown best in FIG. 8, holes 52 and 54 extend through upper and lower pivot-mounting portions 42 and 44, respectively, and a hole 56 extends through link-mounting portion 50 in alignment with holes 52 and 54. A carriage bolt 56, which serves as a pivot connector, extends through holes 52, 54 and 50 and is secured by a nut 58. This arrangement provides means by which slat connector 32 is pivotably attached to attachment link 30.

Slat connector 32 also includes a slat-mounting portion 60 which has a slanted slat-engaging surface 62. Near each slat end 28 is a hole 66 through slat 26. A bolt 64 extends through hole 66 and through a hole 68 in slat-engaging surface 62 to engage a nut 70. This arrangement provides means for pivotable attachment of slat 26 to slat connector 32.

The pivotable attachment of slat connector 32 to attachment link 30 is about a first axis transverse to the chain direction. Indeed, such first axis is normal (perpendicular) to the chain direction. The pivotable attachment of slat 26 to slat connector 32 is about a second axis which is transverse to both the first axis and the chain direction.

This arrangement of axes provides a double-pivoting mount for slats 26. Such double-pivoting mounts accommodate the temporary deformations in slats 26 which are caused by a variety of forces and loads. Likewise, the spring back from such deformations will be accommodated by such double-pivoting mounts. Slats 26 can be twisted, bowed and/or lifted at one end without undue strain or damage. Whatever sort of deformation occurs, even during the most strenuous application of shock loads and forces, the securing means is able to accommodate the resulting deformations.

As illustrated in the figures, slats 26 are angled with respect to conveyor surface 20. Each slat 26 has a lead edge 72 which is away from conveyor surface 20 and a trailing edge 74 which is adjacent to surface 20. This angling of slats 26 is set by the angle of slat-engaging surface 62 of slat connector 32. Slats 26 have front and back surfaces 76 and 78, respectively. It is preferred that the angle of slat 26, that is, the angle of front surface 76 with respect to conveyor surface 20, be in excess of 60°, most preferably on the order of 70°. The angling of slats 26 with respect to surface 20 tends to draw crop material against conveyor surface 20.

The configuration and orientation of slat connector 32 is preferably such that its slat-mounting portion 60 is behind its link-mounting portion 60, and such that slat-mounting portion 60 is closer to rearward pin 40 of chain 22 than it is to forward pin 38. Thus, slats 26 are in trailing positions with respect to the mid-lengths of the main portions 34 of their attachment links 30, aligned with the rearward ends of main portions 34.

Such location of slats 26 during their motion around the upper sprocket 80, which is shown in FIGS. 1 and 2, tends to reduce crop accumulation on back surfaces 78 of slats 26. This tends to reduce the resultant back feed of crop material during the return movement of slats 26, along the upper reaches of chains 22. The aforementioned angling of slats 26 is also helpful in reducing such back feed.

Figure 7:
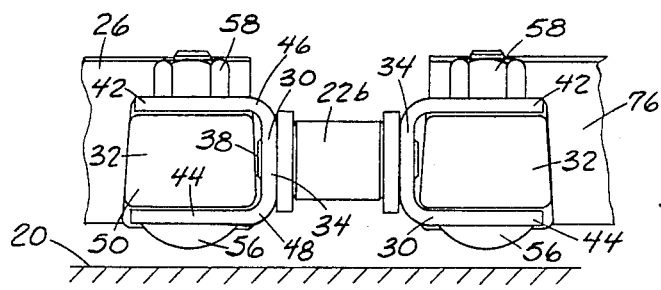
FIG. 7 is a right side elevation of FIG. 5.

As shown best in FIGS. 3, 6 and 7, middle chain 22b has mirror-image attachment links 30 on either side. However, such mirror-image attachment links (and their related parts) function entirely independently of each other.

The combine conveyor of this invention may be made using common and widely available materials and a number of available parts. Specialized parts, of course, must be fabricated, and this may be done in a variety of methods well known to those skilled in the art.

While the principles of this invention have been described in connection with specific embodiments, it should be understood clearly that these descriptions are made only by way of example and are not intended to limit the scope of the invention.

What is claimed:

1. In a combine conveyor of the type having a conveyor surface, at least two chains having parallel reaches along the surface, elongated carriers extending across the surface and means securing opposite ends thereof with respect to the chains, the improvement comprising:
   resiliently deformable slats as the carriers; and
   the securing means including means allowing adjustment of position and orientation of the ends,
   whereby the carriers can respond to loads, forces and obstacles without damage to the conveyor.

2. The combine conveyor of claim 1 wherein the slats are substantially flat.

3. The combine conveyor of claim 2 wherein the slats are of spring steel.

4. The combine conveyor of claim 2 wherein the slats are angled with respect to the surface, each having a lead edge away from the surface and a trailing edge adjacent to the surface, whereby material carried thereby tends to be drawn against the surface.

5. The combine conveyor of claim 1 wherein the securing means for at least one of the opposite ends comprises:
   an attachment link attached to the chain;
   a slat connector pivotably attached to the attachment link; and
   means pivotably attaching the slat to the slat connector.

6. The combine conveyor of claim 5 wherein:
   the pivotable attachment of the slat connector to the attachment link is about a first axis transverse to the chain direction; and
   the pivotable attachment of the slat to the slat connector is about a second axis transverse to the first axis and the chain direction,
   whereby a double-pivoting mount is provided.

7. The combine conveyor of claim 6 wherein the slats are substantially flat.

8. The combine conveyor of claim 7 wherein the slats are of spring steel.

9. The combine conveyor of claim 7 wherein the slats are angled with respect to the surface, each having a lead edge away from the surface and a trailing edge adjacent to the surface, whereby material carried thereby tends to be drawn against the surface.

10. The combine conveyor of claim 6 wherein the first axis is substantially normal to the chain direction.

11. The combine conveyor of claim 10 wherein the slats are substantially flat.

12. The combine conveyor of claim 11 wherein the slats are of spring steel.

13. The combine conveyor of claim 11 wherein the slats are angled with respect to the surface, each having a lead edge away from the surface and a trailing edge adjacent to the surface, whereby material carried thereby tends to be drawn against the surface.

14. The combine conveyor of claim 6 wherein:
   the attachment link has a main portion connected to two chain pins, including a forward pin and a rearward pin, and pivot-mounting portions extending laterally from the main portion; and
   the slat connector has a link-mounting portion engaging the pivot-mounting portions of the attachment link.

15. The combine conveyor of claim 14 comprising:
   upper and lower edges along the attachment link main portion, the attachment link pivot-mounting portions including spaced upper and lower portions along the upper and lower edges, respectively;
   the slat connector link-mounting portion being received between the upper and lower portions of the attachment link; and
   a pivot connector joining the slat connector link-mounting portion with the attachment link upper and lower portions.

16. The combine conveyor of claim 15 wherein the attachment link main portion forms a portion of the chain.

17. The combine conveyor of claim 15 wherein the slat connector has a slat-mounting portion behind the link-mounting portion and located closer to the rearward pin than the forward pin, whereby accumulation of crop material on the back side of the slats and crop back feed are reduced.

18. The combine conveyor of claim 17 wherein the slats are substantially flat.

19. The combine conveyor of claim 18 wherein the slats are of spring steel.

20. The combine conveyor of claim 18 wherein the slats are angled with respect to the surface, each having a lead edge away from the surface and a trailing edge adjacent to the surface, whereby material carried thereby tends to be drawn against the surface.

* * * * *